(12) United States Patent
Taylor (10) Patent No.: US 7,438,087 B1
(45) Date of Patent: Oct. 21, 2008

(54) OVERPRESSURE ROTARY VALVE ASSEMBLY WITH LOCKING PIN AND COLLAPSIBLE MEMBER

(75) Inventor: Julian S. Taylor, Oklahoma City, OK (US)

(73) Assignee: Taylor Innovations, L.L.C., Oklahoma City, OK (US)

( * ) Notice: Subject to any disclaimer, the term of this patent is extended or adjusted under 35 U.S.C. 154(b) by 286 days.

(21) Appl. No.: 11/240,680

(22) Filed: Sep. 30, 2005

(51) Int. Cl.
*F16K 17/14* (2006.01)
*F16K 17/40* (2006.01)

(52) U.S. Cl. .................................... 137/624.27; 137/70
(58) Field of Classification Search ................. 137/70, 137/624.27
See application file for complete search history.

(56) References Cited

U.S. PATENT DOCUMENTS

| | | | |
|---|---|---|---|
| 3,038,485 A | | 6/1962 | Hosek |
| 3,638,683 A | * | 2/1972 | Krieter .................. 137/624.27 |
| 3,871,405 A | * | 3/1975 | Schwarz ................ 137/624.27 |
| 3,941,151 A | | 3/1976 | Biddle |
| 4,651,972 A | * | 3/1987 | Yankoff ................. 137/624.27 |
| 4,862,919 A | * | 9/1989 | Stemmer ............... 137/624.27 |
| 5,024,416 A | | 6/1991 | Cohen |
| 5,607,140 A | | 3/1997 | Short, III et al. |
| 5,836,337 A | * | 11/1998 | Taylor .......................... 137/70 |
| 6,155,284 A | * | 12/2000 | Scantlin ....................... 137/70 |
| 6,491,055 B2 | | 12/2002 | Brazier et al. |
| 6,666,230 B1 | | 12/2003 | Taylor |
| 6,799,597 B1 | * | 10/2004 | Taylor ................... 137/624.27 |
| 6,895,926 B1 | | 5/2005 | Moreau et al. |
| 6,920,894 B1 | | 7/2005 | Nickeas et al. |

\* cited by examiner

*Primary Examiner*—John Rivell
(74) *Attorney, Agent, or Firm*—Fellers, Snider, et al.

(57) ABSTRACT

An overpressure rotary valve assembly for detecting and abating an overpressure condition. A valve member is configured for movement between a closed position and an open position. A locking pin contactingly retains the valve member in a selected one of the open and closed positions. A piston is coupled to the locking pin, and a collapsible member is coupled to the piston. When a fluidic pressure upon the piston reaches a predetermined threshold, the piston mechanically collapses the collapsible member and pulls the pin from the valve member, thereby freeing the valve member to move to the remaining one of the open and closed positions. The locking pin is preferably decoupled from the piston so that the pin remains in place during initial stages of piston movement. Differential pressure across the valve member does not alter the setpoint since only upstream inlet fluid is applied to the piston.

21 Claims, 8 Drawing Sheets

OVERPRESSURE ROTARY VALVE ASSEMBLY WITH LOCKING PIN AND COLLAPSIBLE MEMBER

FIELD OF THE INVENTION

This invention relates generally to the field of pressurized fluid systems and more particularly, but not by way of limitation, to an apparatus for detecting and abating an overpressure condition in a pressurized fluid system.

BACKGROUND

Pressurized fluid systems are often provided with pressure relief capabilities to prevent injury to personnel and damage to equipment. In the event of an overpressure condition, an overpressure valve assembly can be used to establish a bypass or shut-off path for the pressurized fluid.

Valve assemblies can be configured to be normally open (NO) or normally closed (NC). Collapsible members such as buckling pins and rupture disks can be used to control the set point at which such valve members operate to close, or open, respectively.

A particular overpressure relief configuration proposed in the art generally utilizes a downstream main pressure relief valve in series with an upstream overpressure device, such as a rupture disk. The rupture disk generally isolates the downstream valve from normal fluidic flow; that is, the rupture disk is intended to retain the fluid until the overpressure condition is reached, after which the disk ruptures and the pressurized fluid passes to the main pressure relief valve.

A limitation with this approach includes the fact that any fluidic pressure that may develop between the upstream and downstream devices, such as via a leak through or around the rupture disk, will generally tend to alter the differential pressure across the upstream device. In such case, the set point at which the upstream device opens will be undesirably higher than the specified level.

It is thus common to use pressure indicators, such as a human readable pressure gauge, to detect such buildup of pressure between the upstream and downstream devices. When an undesirably high level of intermediate pressure is detected, maintenance actions are required to address the situation, which can include installation of a new, replacement rupture disk in the upstream device.

Another limitation associated with the use of rupture disks in the above configuration is the fact that while rupture disks are generally intended to open in a controlled manner and remain in a single piece, due to the forces involved it has sometimes been found that portions of a ruptured disk can separate and be carried along with the fluidic flow to the main pressure relief valve. This is generally undesirable in that such particles may interfere with the proper opening or subsequent closing of the main valve.

Thus, while the existing art provides a variety of operable solutions, there nevertheless remains a continued need for improvements in the manner in which overpressure conditions in various pressurized fluid system configurations can be detected and relieved. It is to these and other improvements that preferred embodiments of the present invention are generally directed.

SUMMARY OF THE INVENTION

Preferred embodiments of the present invention are generally directed to an overpressure rotary valve assembly configured to detect and abate an overpressure condition in a pressurized fluid system.

In accordance with preferred embodiments, a valve member is configured for movement between a closed position and an open position. A locking pin contactingly retains the valve member in a selected one of the open and closed positions. A piston is coupled to the locking pin, and a collapsible member is coupled to the piston.

When a fluidic pressure upon the piston reaches a predetermined threshold, the piston mechanically collapses the collapsible member and retracts the pin, thereby freeing the valve member to move to the remaining one of the open and closed positions.

The locking pin is preferably decoupled from the piston so that the pin remains in place during initial stages of piston movement. The effects of differential pressure across the valve member are preferably avoided by providing inlet fluid to the piston solely from a location upstream of the valve member.

The valve assembly can be of the normally closed (NC) or normally open (NO) type, as desired. The valve member preferably has a flapper type valve construction, an unbalanced butterfly type valve construction, or a clapper valve type construction.

These and various other features and advantages which characterize the claimed invention will be apparent from a reading of the following detailed description and a review of the associated drawings.

DETAILED DESCRIPTION

Figure 1:
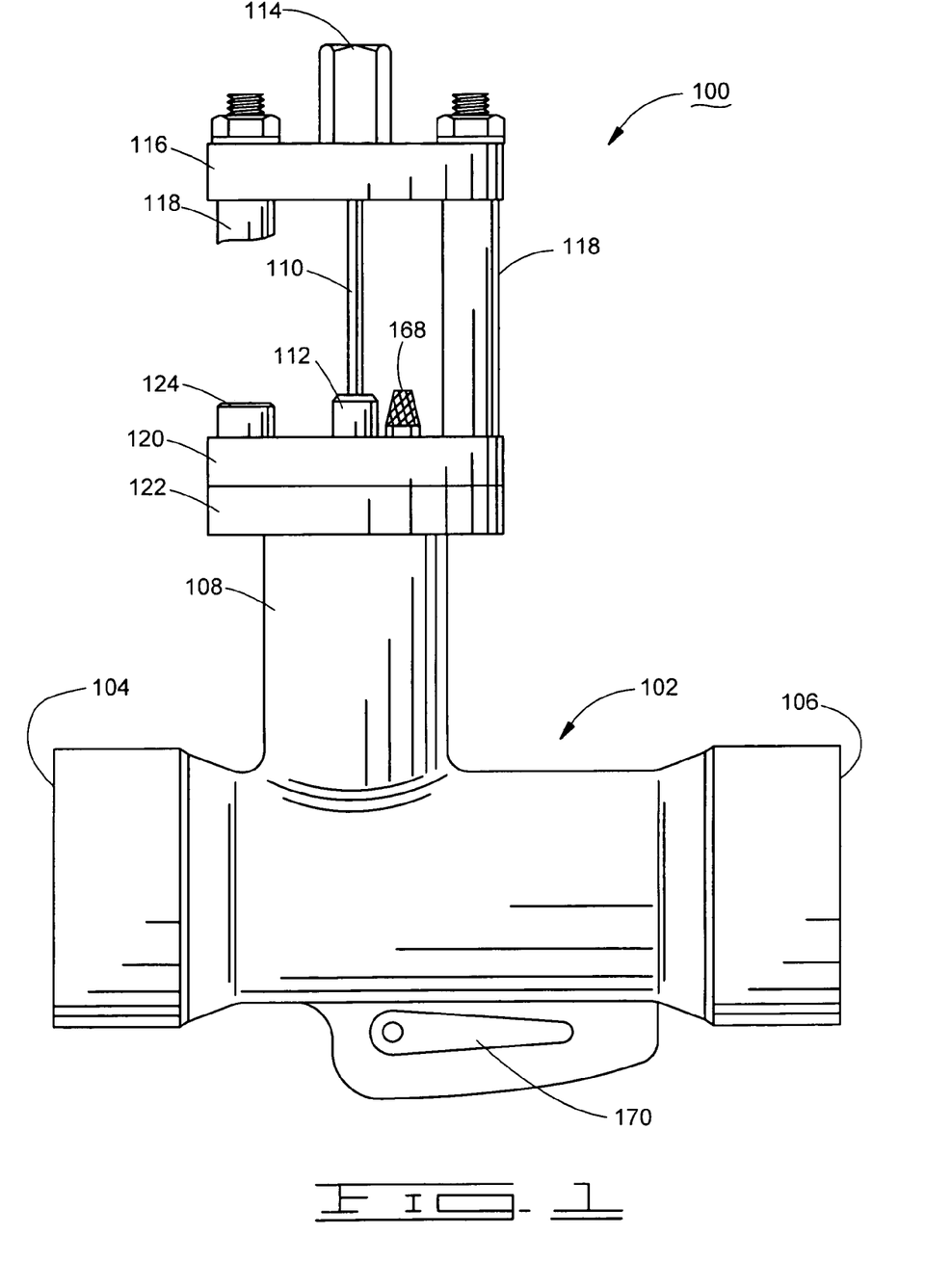
FIG. 1 is an elevational view of an overpressure relief valve assembly constructed and operated in accordance with preferred embodiments of the present invention.

FIG. 1 generally illustrates an overpressure relief valve assembly 100 constructed and operated in accordance with preferred embodiments of the present invention. The valve assembly 100 is contemplated as forming a portion of a larger pressurized fluid system in which a pressurized fluid, such as natural gas, is transported.

The valve assembly 100 preferably operates as a normally closed (NC), overpressure relief valve to establish a bypass path for the fluid in the event of an overpressure condition. The valve assembly 100 can operate in a stand-alone fashion, or can be arranged serially as an upstream device to isolate a downstream main pressure relief valve from fluidic flow until an overpressure condition is reached.

As shown in FIG. 1, the valve assembly 100 preferably comprises a generally t-shaped housing 102 with an inlet port 104, an outlet port 106, and a stem portion 108. A collapsible member 110, preferably characterized as a buckling pin, is supported between a piston 112 and a pin holding nut 114 (only a distal portion of the piston 112 is visible in FIG. 1).

The nut 114 is supported by an upper plate 116 via standoffs 118. Preferably, three such standoffs 118 are radially arranged about the pin 110 and extend between the upper plate 116 and a lower plate 120. The lower plate 120 is secured to an annular flange 122 of the stem portion 108 via a number of fasteners 124 interposed between the standoffs 118.

Figure 2:
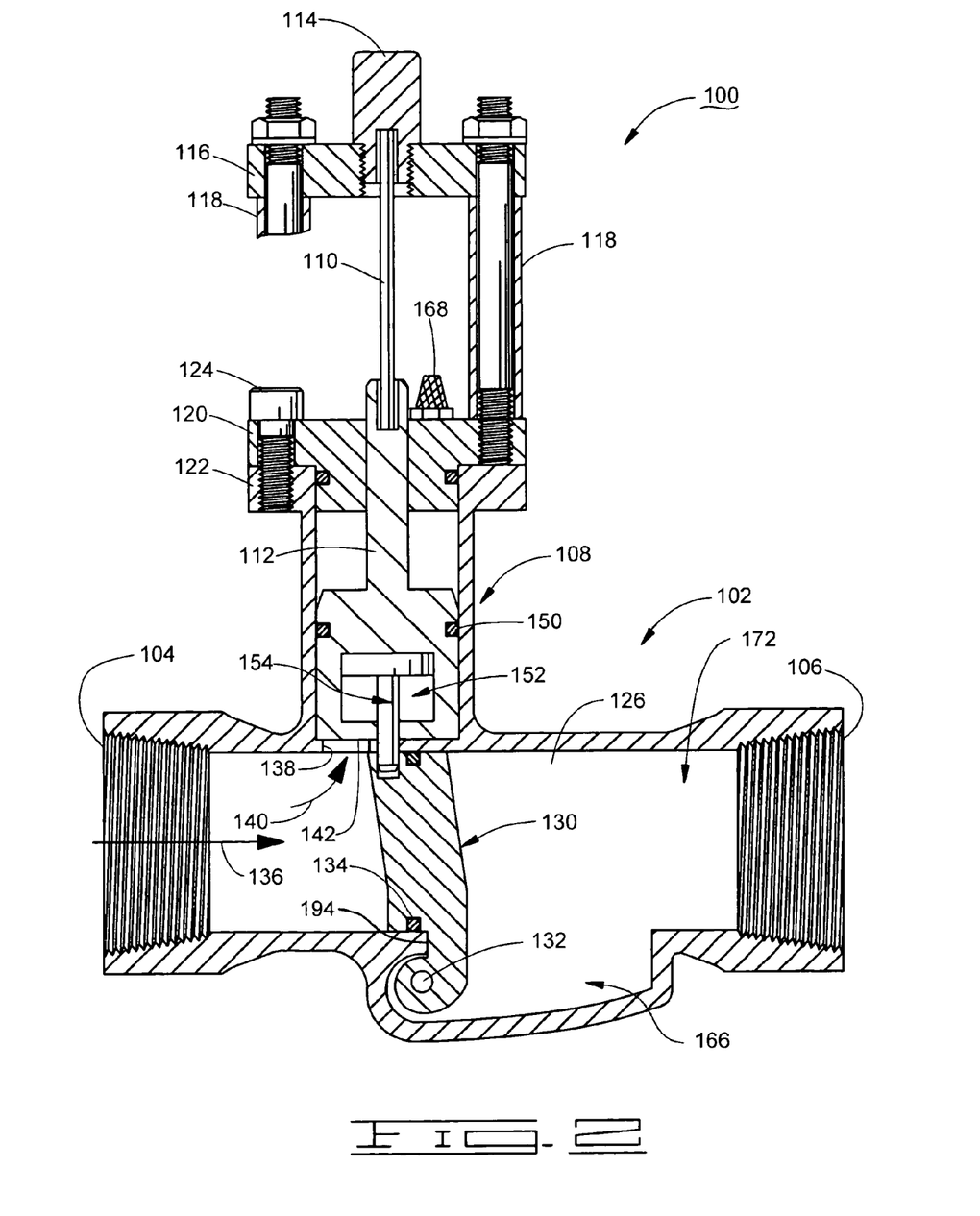
FIG. 2 shows the valve assembly of FIG. 1 with an internal rotary valve member in a normally closed position.

FIG. 2 provides a cross-sectional view of the valve assembly 100 of FIG. 1. An interior conduit surface 126 forms a central fluidic pathway from the inlet port 104 to the outlet port 106.

Disposed within this central fluidic pathway is a valve member 130. The valve member 130 is mounted for rotation with a rotatable press-fit pin 132, and includes an annular sealing ring 134 (an o-ring in this embodiment). The valve member 130 is shown in FIG. 2 to be in a closed position, so that inlet fluid, represented by arrow 136, is essentially prevented from passage to the outlet port 106 due to an annular seal established between the sealing ring 134 and a seating portion of the interior conduit surface 126. It will be appreciated that the valve member 130 as embodied in FIG. 2 can be characterized as an offset flapper type valve member, although such is not limiting.

Figure 3:
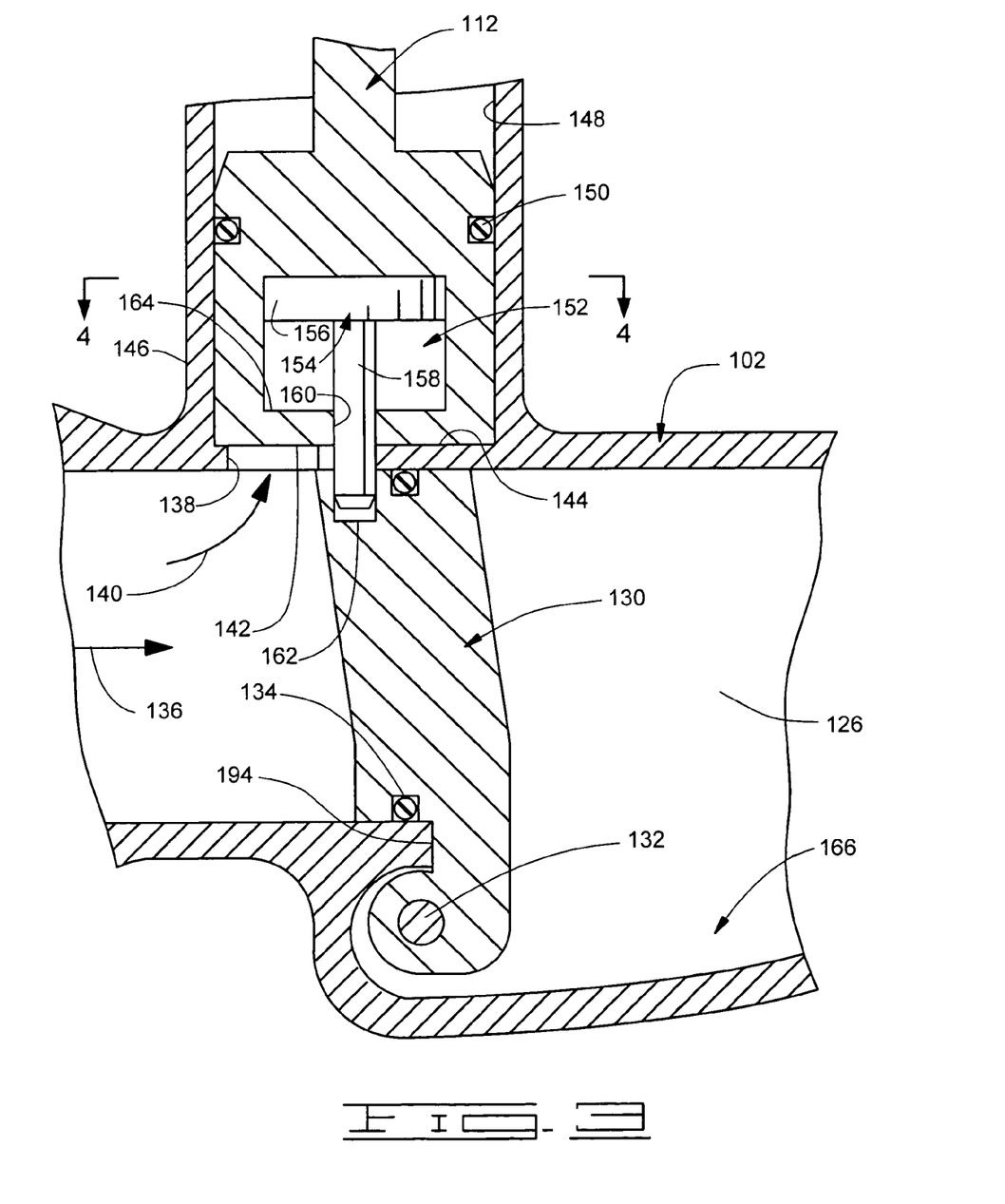
FIG. 3 shows portions of the valve assembly of FIG. 2 in greater detail.
Figure 4:
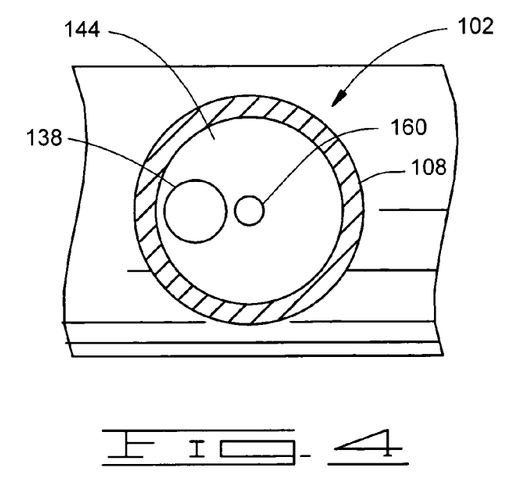
FIG. 4 shows a top-down, partial cross-sectional view along line 4-4 in FIG. 3.

As shown in greater detail in FIGS. 3 and 4, the interior conduit surface 126 includes an aperture 138 upstream of the valve member 130. This aperture 138 is in fluidic communication with the inlet port 104 so as to permit a portion of the inlet fluid, as indicated by arrow 140, to bear against a piston surface 142 of the piston 112.

While only a portion of the surface 142 is immediately adjacent to and in facing relation to the aperture 138, it will be understood that the inlet fluid 140 will preferably flow between the entirety of the surface 142 and an upper surface 144 of the housing 102 (see FIG. 4). The force applied to the piston 112 as a result of this inlet fluid will generally be a function of the pressure of the fluid and the exposed surface area of the piston 112. This applied force is countered by a compressive force supplied by the pin 110.

For reference, it is contemplated that the inlet fluid will additionally seep between an outer annular surface 146 of the piston and an interior side wall 148 of the stem portion 108 up to a sealing ring 150 of the piston 112 (best viewed in FIG. 3). However, the applied force from this portion of the fluid will generally act in a transverse direction to the axial direction of the pin 110, and thus will not generally contribute to the overall compressive force exerted upon the pin 110.

As desired, detents or other localized spacing features can be applied to the downwardly extending surface 142 of the piston 112, and/or to the upwardly extending surface 144 of the housing 102, in order to controllably establish a small gap between the surfaces 142, 144. Nevertheless, although not required, it is preferred that the lower piston surface 142 be maintained in a contacting relationship against the upper housing surface 144 by way of the pin 110.

Figure 5:
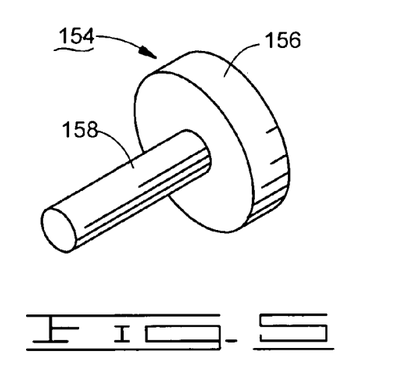
FIG. 5 provides an isometric view of a locking member of the valve assembly of FIGS. 2 and 3.

The piston 112 further preferably includes an interior chamber 152 in which a slidable locking member 154 is disposed. The locking member 154 is shown in isometric fashion in FIG. 5 and preferably includes a disk-shaped base 156 and a locking pin 158 extending therefrom.

The base 156 is preferably shaped to freely slide within the chamber 152 of the piston 112. The pin 158 preferably extends through an aperture 160 in the housing 102 (best viewed in FIG. 4), and into a pin recess 162 of the valve member 130 (see FIG. 3). The pin 158 serves to lock the valve member 130 in the closed position during normal operation.

The valve assembly 100 is preferably designed to move from the closed position to an open position when the pressure of the inlet fluid 136 reaches a predetermined threshold level. When this fluidic pressure level is reached, the force applied to the piston 112 will be greater than the force required to buckle the pin 110 in accordance with Euler's Law, resulting in mechanical collapse of the pin 110, and an upwardly directed acceleration of the piston 112.

Figure 6:
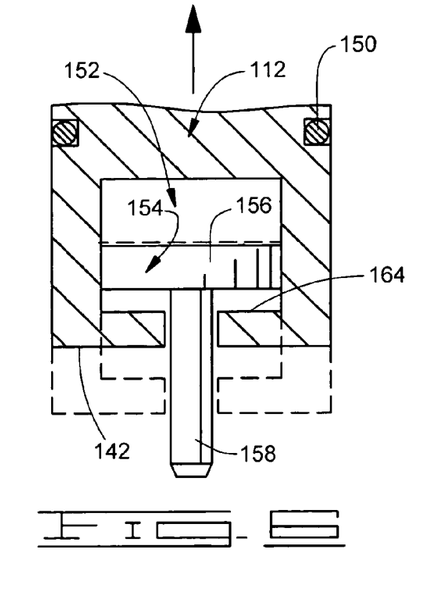
FIG. 6 shows relevant portions of the valve assembly during initial stages of piston movement from the closed position to an open position.

Preferably, it is contemplated that the locking pin 154 will initially remain in the locked position during initial stages of the piston acceleration, as depicted in FIG. 6. That is, the piston 112 will move relative to the locking pin 158 until such time that an engagement surface 164 of the piston engages the disc 156 of the locking member 154. At this point, the piston 112 will retract (pull) the locking pin 158 from the recess 162, and the inlet fluid 136 will move the valve member 130 to an open position, as shown in FIG. 7.

Figure 7:
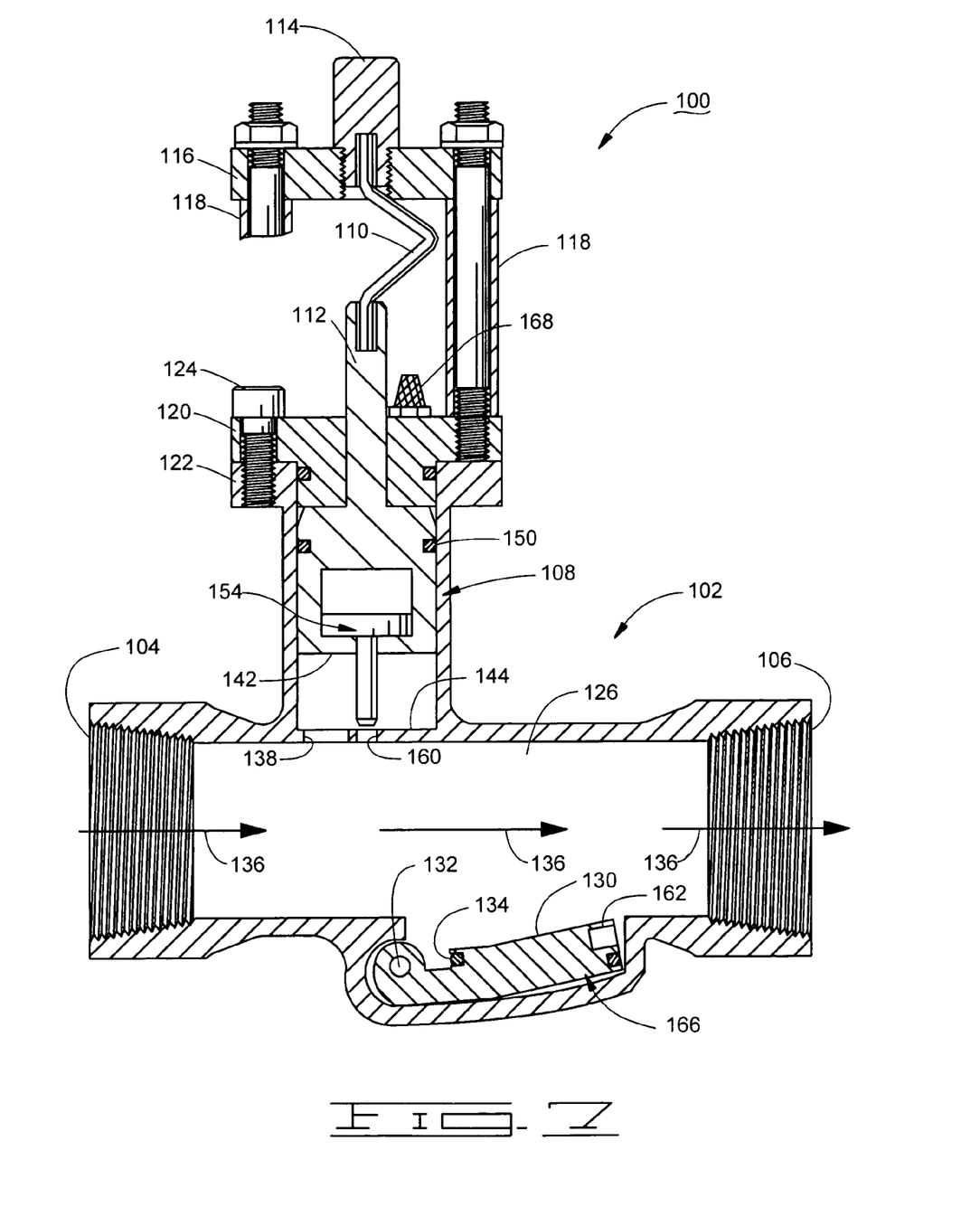
FIG. 7 shows the valve assembly of FIGS. 2 and 3 with the rotary valve member in an open position.

As further shown in FIG. 7, a recess 166 in the lower portion of the housing 102 is provided to receive the opened valve member 130 and permit substantially unrestricted flow from inlet port 104 to outlet port 106. A vent port 168 in the stem 108 is open to the surrounding atmosphere to allow trapped air to be vented during the upward movement of the piston 112.

At such time that the valve assembly 100 is to be returned to the closed position and reset to the steady state operational condition of FIG. 2, the inlet pressure is first preferably temporarily shut off, such as by an upstream manual valve (not shown). An external handle 170 (FIG. 1) or other suitable mechanism such as a wrench, etc., is preferably coupled to the valve member 130 by way of pin 132, FIG. 2, and manually rotated to align the valve member 130 in the closed position. Although not shown, it will be understood that suitable sealing and bearing mechanisms are provided as required to allow the external handle 170 to engage and rotate the pin 132.

Once the valve member 130 has been returned to the closed position, the nut 114 (FIG. 2) is disengaged from the plate 116, the collapsed pin 110 is removed, and a new replacement pin 110 is inserted. Preferably, during this operation the piston 112 will be manually pushed back down into the stem 108 so that the piston surface 142 is once again brought into abutment with the upper surface 144 of the housing 102.

Downward advancement of the piston 112 will advance the pin 158 of the locking member 154 back into the recess 162 of the valve member 130. Successful engagement of the pin 158 into the recess can be readily verified by subsequent attempts to rotate the handle 170; if the pin 158 is in fact properly seated, no such rotation of the handle 170 can be made.

Finally, the nut 114 is tightened in place and, at this point, the system is returned to the normally closed, "armed" state of FIG. 2 so that inlet pressurized fluid can once again be supplied and monitored by the valve assembly 100.

Preferably, the handle 170 (or other mechanism) is configured to be removable and is not left in place once the valve assembly 100 is reset. A hex head, a D-shape, or other suitable driving surface configuration can be provided to allow the user to readily determine the angular position of the internal valve member 130. External markings can also be supplied to the exterior of the housing 102 to indicate a "closed" position and an "open" position for the valve member 130. Automated sensing and/or actuation mechanisms can alternatively be employed as desired to reset the valve assembly 100 to the normally closed position.

At this point it will be appreciated that the above described embodiments provide several advantages over the prior art. A first advantage relates to the fact that the setpoint at which the valve assembly operates is preferably isolated to an upstream inlet pressure, and not a differential pressure across the valve member 130.

Unlike prior art applications including the rupture disk configurations discussed above, the presence of fluidic pressure downstream of the valve member 130, such as in zone 172 denoted in FIG. 2, will generally have no effect on the operational setpoint for the valve member 130. More specifically, unless the downstream pressure is so great as to approximate the upstream pressure, the valve member 130 is substantially guaranteed to open within a very small variation range about the set point (e.g., on the order of about ±5%). This eliminates the need to monitor this pressure and periodically service the valve assembly 100 due to ruptured disks or other failed mechanisms.

Another advantage of the embodiments presented herein is the preferred triggering operation carried out upon the locking member 154 by way of the piston 112. An advantage of this approach is that, particularly in situations involving higher fluidic pressures, the initial acceleration of the piston 112 will allow the imparting of significant kinetic energy to the stationary locking member 154, thereby overcoming any static frictional (stiction) forces between the pin 158 and the recess 162. This helps to ensure the reliable retraction of the pin 158 and opening of the valve assembly 100, as well as to ensure that any such stiction/friction does not alter the setpoint.

Figure 8:
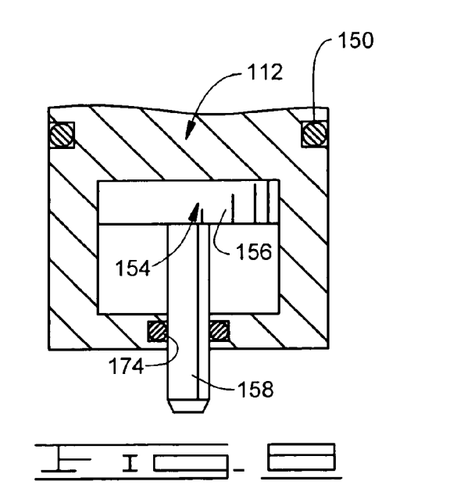
FIG. 8 provides an alternative embodiment of the valve assembly of FIGS. 2 and 3 in which a sealing member is interposed between the piston and locking member.

As desired, an o-ring or other sealing member can be placed between the piston 112 and the locking pin 158, such as shown at 174 in FIG. 8. This will substantially remove the effects of inlet pressure within the interior chamber 152 of the piston 112. As before, the locking pin 158 will remain engaged with the valve member 130 until the pin 158 is pulled by the piston 112, as discussed previously with respect to FIG. 6.

Figure 9:
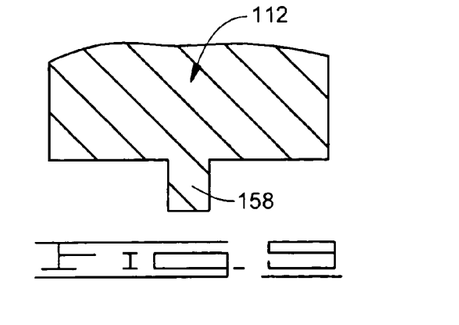
FIG. 9 illustrates another alternative preferred embodiment in which the locking pin forms a portion of the piston member.
Figure 10:
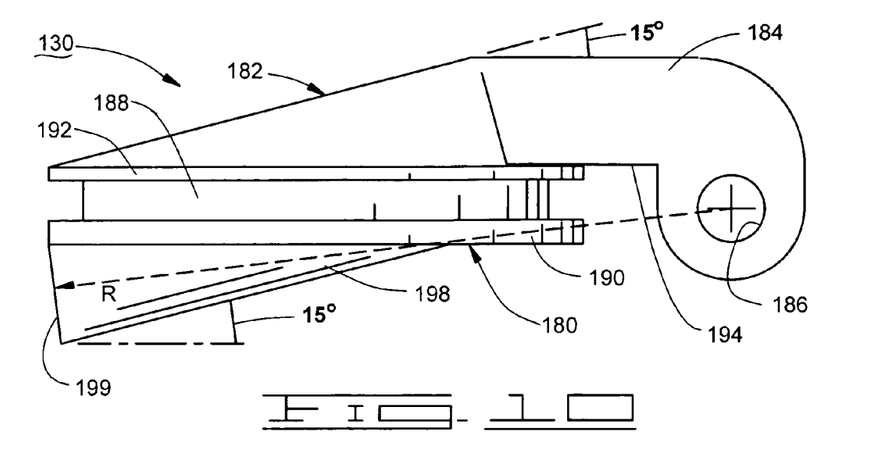
FIG. 10 provides a side elevational view of the rotary valve member of FIGS. 2, 3 and 7 in accordance with a preferred embodiment.
Figure 11:
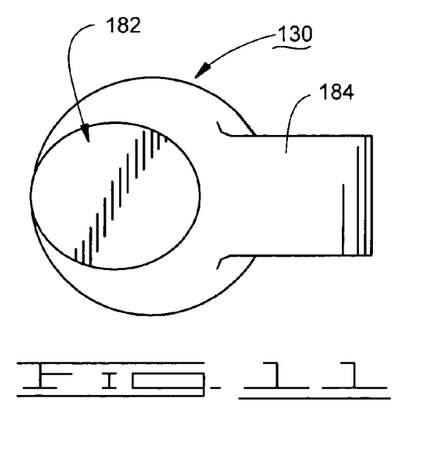
FIG. 11 is a top plan view of the rotary valve member.

While it is deemed advantageous to separate the locking pin 158 from the piston 112 in the aforedescribed manner, such is not necessarily required. In an alternative preferred embodiment, the locking pin 158 is formed as a permanently affixed extension of the piston 112, as depicted in FIG. 9. In this case, it is contemplated that the stictional force between the locking pin 158 and the recess 162 will oppose upward movement of the piston 112; however, this should not be a significant factor in many applications. As before, the piston 112 in FIG. 9 operates to retract the pin 158 when the predetermined fluidic pressure threshold is reached.

In each of the above alternative embodiments, a relatively low frictional coating or material, such as polytetrafluoroethylene, is preferably applied to the locking pin 158 and/or the recess 162 to reduce the effects of static and dynamic friction between these elements.

Additional views of the valve member 130 are shown in FIGS. 10-14. As mentioned previously, the valve member 130 is preferably characterized as having a substantially annular, flapper type construction. The valve member 130 includes opposing upstream and downstream surfaces 180, 182. A support arm 184 extends as shown and includes a bore 186 to accommodate the aforementioned rotary pin 132.

An annular channel 188 is formed by a pair of radially extending flanges 190, 192 to accommodate the sealing ring 134. The valve member 130 preferably includes a limit surface 194 that preferably engages the interior conduit surface 126 (FIG. 2) when the valve member 130 is fully rotated to the closed position.

Figure 12:
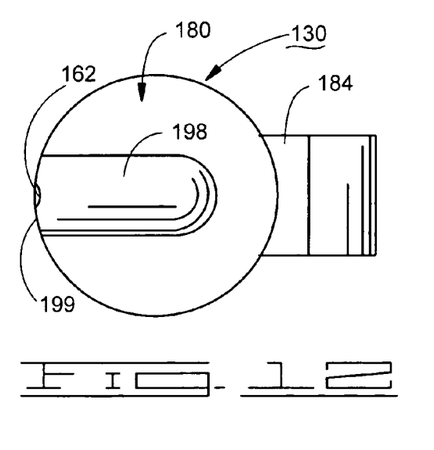
FIG. 12 is a bottom plan view of the rotary valve member.
Figure 13:
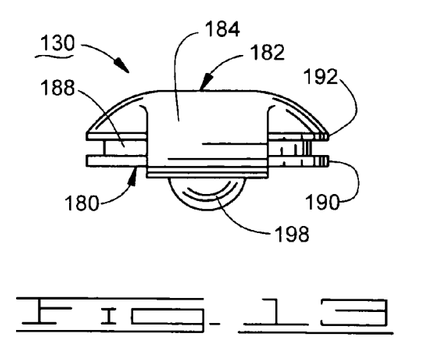
FIGS. 13 and 14 are respective end views of the rotary valve member.
Figure 14:
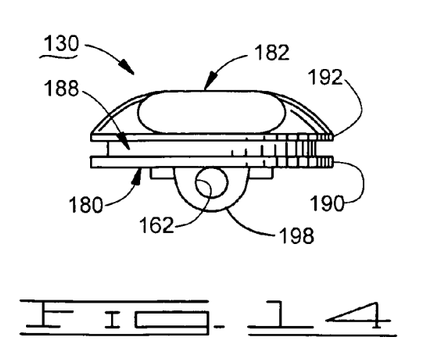

The downstream surface 180 preferably includes an elongated, tapered projection 198 (best viewed in FIG. 12). The projection 198 houses the recess 162 and preferably extends at a selected angle with respect to the flanges 190, 192 (such as 15 degrees, as shown). The downstream surface 182 likewise preferably extends at this same angle.

A distal end surface 199 of the projection 198 is preferably radiused as shown to permit rotational clearance of the valve member 130 from the closed position to the open position. The valve member 130 is preferably formed from a high strength, impermeable material, such as metal or plastic using a molding or casting operation.

Figure 15:
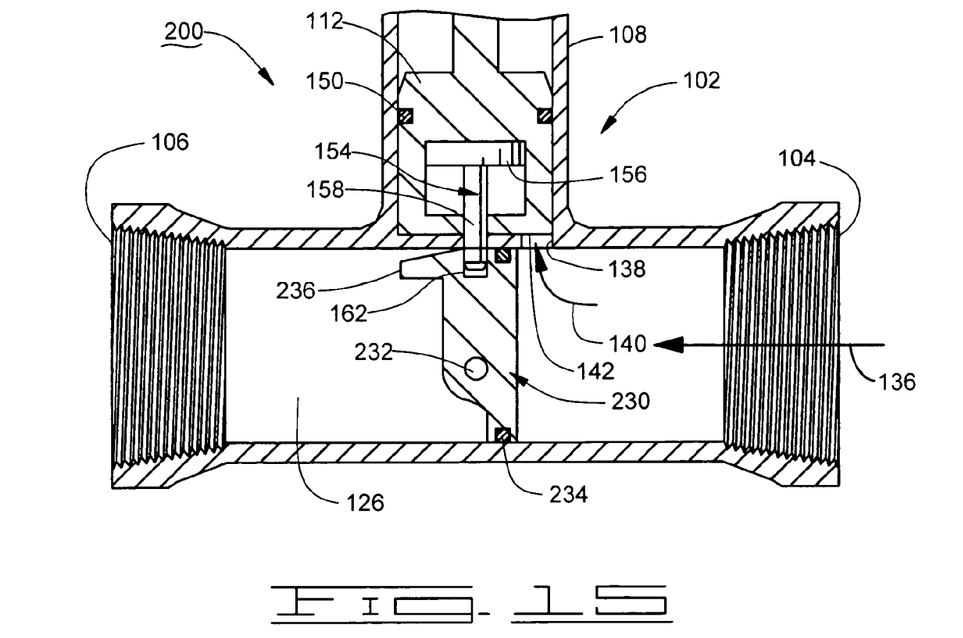
FIG. 15 illustrates an alternative preferred embodiment for a normally closed overpressure relief valve assembly, with the valve assembly in FIG. 15 being in the normally closed position.

FIG. 15 provides a valve assembly 200 that is generally similar to the valve assembly 100 referenced in FIGS. 1-14. Like numerals have been used to identify components that are similar in these respective embodiments. As before, the piston 112 is arranged to compressingly engage a collapsible pin (such as 110 in FIGS. 1, 2 and 4). It will be noted that the direction of flow from inlet 104 to outlet 106 in FIG. 15 has been reversed as compared to that shown previously.

FIG. 15 additionally provides a normally closed valve member 230. The valve member 230 is preferably characterized as having an unbalanced butterfly type valve construction. The valve member 230 rotates via pin 232, and forms a fluidic seal between sealing member 234 and conduit surface 126.

Figure 16:
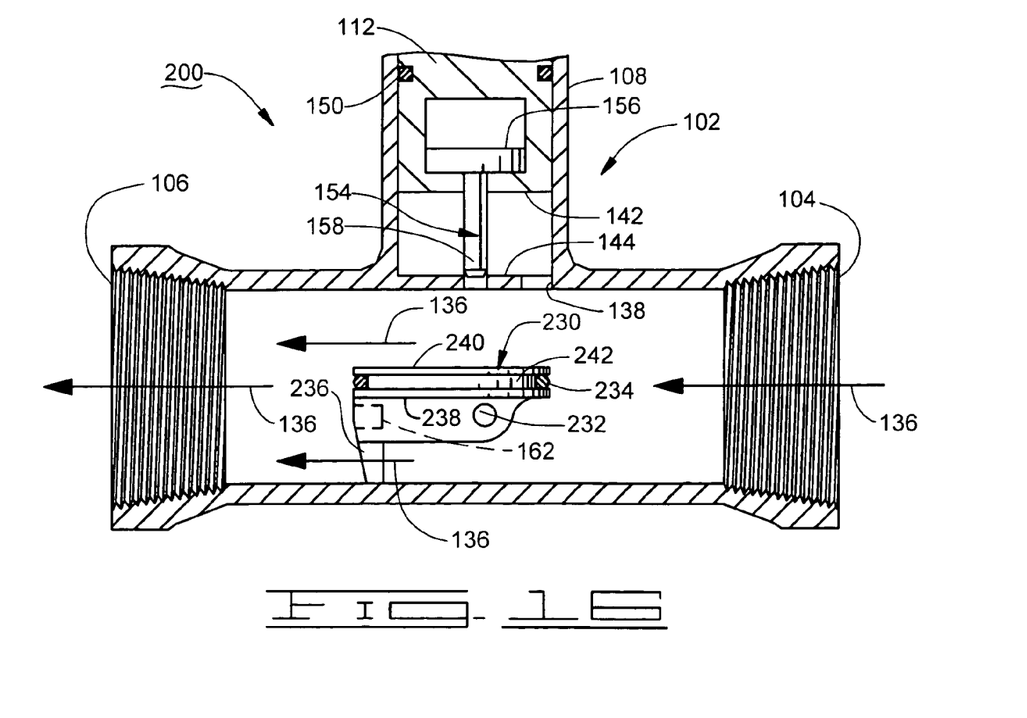
FIG. 16 shows the valve of FIG. 15 in the open position.

As before, a portion of the inlet fluid 140 passes through aperture 138 to bear against piston 112. When the predetermined threshold level is reached, the collapsible pin 110 collapses, the piston 112 retracts the locking member 154 from the valve member 230, and the pressure of the inlet fluid rotates the valve member 230 to the open position as shown in FIG. 16. The valve member 230 rotates in the desired direction as a result of the unbalanced forces from the inlet fluid on opposing sides of the pin 232.

Preferably, the valve member 230 includes a standoff member 236, which contacts the interior conduit surface 126 so as to maintain the valve member 230 in a substantially parallel orientation while the valve member 200 is in the open position. As with the valve member 130, the valve member 230 includes a pair of flanges 238, 240 that form a channel 242 to accommodate the sealing member 234 (FIG. 16).

The valve member 230 is reset as before. That is, an external handle or similar mechanism (not shown) engages and rotates the pin 232 to move the valve member 230 back to the normally closed position. Although not shown, an internal alignment feature can be made to extend from the interior conduit surface 126 to serve as a limit stop and ensure proper alignment of the valve member 230 prior to insertion of the locking pin 158 into the recess 162.

As with the embodiment of FIGS. 1-14, the embodiment of FIGS. 15-16 advantageously operates at a predetermined threshold level that is substantially independent of the downstream pressure, thereby avoiding the problems associated with differential pressure across the member while the valve is in the closed position. Moreover, a triggering configuration of the piston 112 and the locking member 154 is preferred, but not required.

Figure 17:
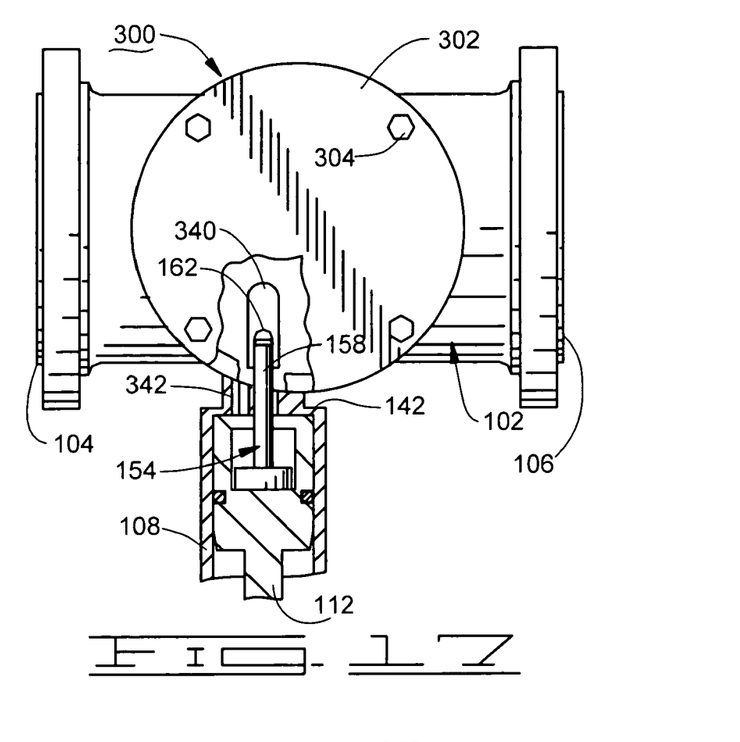
FIGS. 17 and 18 provide respective views of a normally open overpressure relief valve assembly constructed and operated in accordance with preferred embodiments of the present invention.
Figure 18:
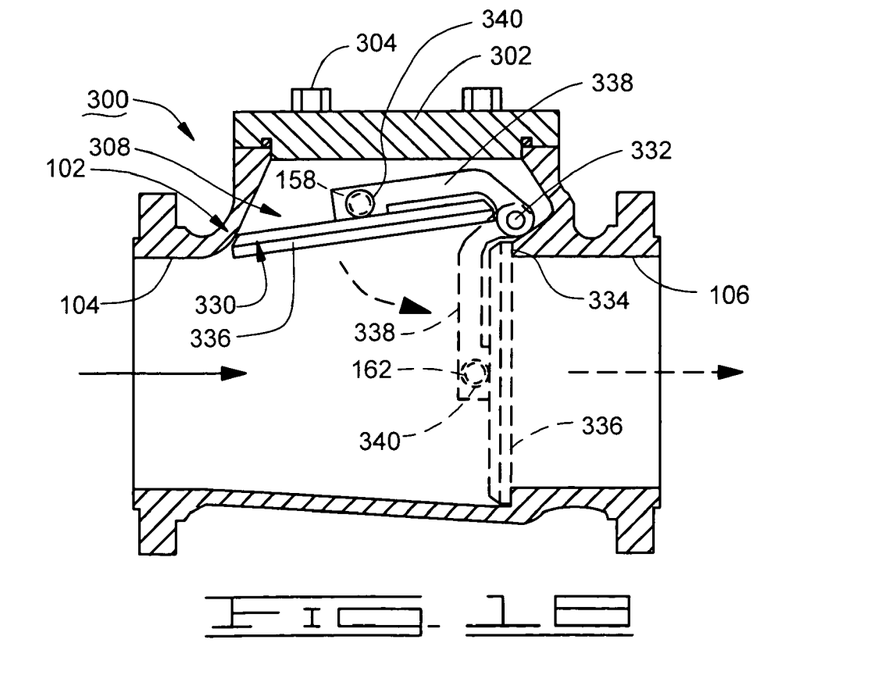

While the preferred embodiments presented herein have been described in terms of a normally closed valve, such is not necessarily required. FIGS. 17 and 18 illustrate yet another valve assembly 300 that includes similar components and operates using similar principles as those set forth for the valve assemblies 100, 200. The valve assembly 300, however, has a normally open configuration and operates as an emergency shut-off valve in the event of an overpressure condition.

As shown in FIG. 17, the housing 102 includes a cover plate 302 mounted transversely to the stem portion 108 via an array of fasteners 304. A sealing member 306 in the form of a compliant (rubber) insert establishes a fluidic seal between the cover plate 302 and remaining portions of the housing 102.

The cover plate 302 cooperates to form an interior recess 308 into which a valve member 330 is normally disposed in an open position, as shown in FIG. 18. The valve member 330 is retained in the open position via the locking pin 158 of locking member 154, as best viewed in FIG. 17. For reference, it will be understood that the pin 158 is shown to be extending into the page in FIG. 18 (in broken line fashion).

The valve member 330 is shown to have a clapper valve type construction, and pivots between the open and closed positions via pin 332. When in the closed position, an annular sealing member 334, preferably characterized as a compliant insert, bears against a seating surface of the interior conduit surface 126.

The valve member 330 includes an annular body 336 supported by a cantilevered arm 338 that couples the body 336 to the pin 332. Preferably, an elongated retention member 340, best viewed in FIG. 17, is integrated with the arm 338 to receive the locking pin 158.

As before, a portion of the inlet fluid 136 is directed to bear against piston surface 142 to place a force upon the collapsible pin (not shown in FIG. 17). This fluid can be passed in a gap surrounding the locking pin 158, or through a separate channel 342.

Once the predetermined threshold level is reached and the pin 158 is retracted by the piston 112, a suitable bias mechanism, such as a coiled spring (not shown), initiates movement of the valve member 330 to the closed position. It will be noted that once the valve member 330 initially rotates down into the fluidic stream, the fluidic pressure will tend to urge and maintain the valve member 330 in the closed position. Depending on the application, the effects of gravity, or an unbalanced surface of the valve member 330, can alternatively or additionally be used to initially urge the retracted valve member down into the fluidic stream.

It will now be appreciated that preferred embodiments of the present invention are generally directed to an apparatus for detecting and abating an overpressure condition in a pressurized fluid system.

In accordance with preferred embodiments, the apparatus comprises a valve member (such as 130, 230, 330) configured for movement between a closed position and an open position, a locking pin (such as 158) which contactingly retains the valve member in a selected one of the open and closed positions, a piston (such as 112) coupled to the locking pin, and a collapsible member (such as 110) coupled to the piston.

When a fluidic pressure upon the piston reaches a predetermined threshold, the piston mechanically collapses the collapsible member and retracts the pin, thereby freeing the valve member to move to the remaining one of the open and closed positions.

Preferably, the valve member characterized as comprising a selected one of a flapper type valve construction (such as 130), an unbalanced butterfly type valve construction (such as 230), or a clapper valve type construction (such as 330). The fluidic pressure exerted upon the piston is preferably provided by inlet fluid adjacent the valve member (such as via apertures 138, 342), and wherein the valve member is moved to the remaining one of the open and closed positions in response to fluidic pressure from said inlet fluid.

The valve member further preferably comprises a recess (such as 162) into which a distal end of the locking pin extends to lock the valve member in the selected position. The apparatus further preferably comprises a housing (such as 102) comprising an inlet port (such as 104) and an outlet port (such as 106) to define a central conduit therebetween (such as by surface 126), and wherein the valve member is wholly disposed within said conduit.

The valve member further preferably comprises an annular sealing member (such as 132, 232, 332) which forms a fluidic seal within said conduit when the valve member is in the closed position so that inlet fluid through the inlet port is substantially restricted from flowing to the outlet port.

In some preferred embodiments, the locking pin is mechanically decoupled from the piston so that, upon said mechanical collapse of the collapsible member, the piston initiates movement in a first direction while the locking pin remains engaged with the valve member (such as shown in FIG. 6). In other preferred embodiments, the locking pin is rigidly affixed to the piston so that the piston and the locking pin move concurrently in response to said fluidic pressure (such as shown in FIG. 9). A sealing member (such as 174) preferably contactingly surrounds the locking pin to form a fluidic seal between the locking pin and the housing.

Reference in the claims below to movement between a closed position and an open position will be understood consistent with the foregoing discussion to cover valves that are configured to be normally closed valves (such as 100, 200), as well as valves that are configured to be normally open valves (such as 300). For purposes of the appended claims, the recited first means will be understood to include the disclosed locking pin 158, and the recited second means will be understood to include the disclosed collapsible member 110 and piston 112.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application of the valve assembly without departing from the spirit and scope of the present invention.

In addition, although the embodiments described herein are generally directed to the correction of an overpressure condition in a pressurized fluid system, it will be appreciated by those skilled in the art that the valve assembly can be used for other types of applications without departing from the spirit and scope of the claimed invention.

What is claimed is:

1. An apparatus comprising a housing having an inlet port and an outlet port defining a central conduit there between, a valve member disposed within the conduit and configured for movement between a closed position and an open position, a locking pin which contactingly retains the valve member in a selected one of the open and closed positions, a piston coupled to the locking pin, and a collapsible member coupled to the piston, wherein when a fluidic pressure upon the piston reaches a predetermined threshold, the piston mechanically collapses the collapsible member and pulls the pin from the valve member, thereby freeing the valve member to move to the remaining one of the open and closed positions.

2. The apparatus of claim 1, wherein the valve member is characterized as comprising a selected one of a flapper type valve construction, an unbalanced butterfly type valve construction, or a clapper valve type construction.

3. The apparatus of claim 1, wherein the fluidic pressure exerted upon the piston is provided by inlet fluid adjacent the valve member, and wherein the valve member is moved to the remaining one of the open and closed positions in response to fluidic pressure from said inlet fluid.

4. The apparatus of claim 1, wherein the valve member further comprises a recess into which a distal end of the locking pin extends to lock the valve member in the selected position.

5. The apparatus of claim 1, wherein the selected position comprises the closed position.

6. The apparatus of claim 1, wherein the selected position comprises the open position.

7. The apparatus of claim 1, wherein the selected position comprises the closed position, and wherein the housing further comprises an aperture disposed between said closed valve member and the inlet port, the aperture providing fluidic communication between the inlet port and the piston so that the fluidic pressure upon the piston is independent of a differential pressure across the valve member.

8. The apparatus of claim 1, wherein the valve member further comprises an annular sealing member which forms a fluidic seal within said conduit when the valve member is in the closed position so that inlet fluid through the inlet port is substantially restricted from flowing to the outlet port.

9. The apparatus of claim 1, wherein the locking pin is rigidly affixed to the piston so that the piston and the locking pin move concurrently in response to said fluidic pressure.

10. The apparatus of claim 1, further comprising a sealing member which contactingly surrounds the locking pin to form a fluidic seal between the locking pin and a housing in which the valve member is disposed.

11. An apparatus comprising a valve member configured for movement between a closed position and an open position, first means for retaining the valve member in a selected one of the open and closed positions, and second means for retracting the first means to free the valve member to move to the remaining one of the open and closed positions, wherein the valve member is characterized as comprising a selected one of a flapper type valve construction, an unbalanced butterfly type valve construction, or a clapper valve type construction.

12. The apparatus of claim 11, wherein the first means comprises a locking pin which physically engages a corresponding recess in the valve member to lock the valve member in the selected position.

13. The apparatus of claim 12, wherein the second means comprises a piston configured to receive a fluidic pressure and a collapsible member coupled to the piston, wherein when said fluidic pressure reaches a predetermined level, the piston moves in a first direction to mechanically collapse the collapsible member and to retract the locking pin from the valve member.

14. The apparatus of claim 13, wherein the piston initially moves while the locking pin remains engaged with the valve member.

15. The apparatus of claim 11, wherein the valve member is moved to the remaining one of the open and closed positions in response to fluidic pressure exerted upon said valve member.

16. The apparatus of claim 11, further comprising a housing comprising an inlet port and an outlet port to define a central conduit there between, and wherein the valve member is wholly disposed within said conduit.

17. An apparatus comprising a valve member configured for movement between a closed position and an open position, a locking pin which contactingly retains the valve member in a selected one of the open and closed positions, a piston coupled to the locking pin, and a collapsible member coupled to the piston, wherein when a fluidic pressure upon the piston reaches a predetermined threshold, the piston mechanically collapses the collapsible member and pulls the pin from the valve member, thereby freeing the valve member to move to the remaining one of the open and closed positions, and wherein the locking pin is mechanically decoupled from the piston so that, upon said mechanical collapse of the collapsible member, the piston initiates movement in a first direction while the locking pin remains engaged with the valve member.

18. The apparatus of claim 17, wherein as the piston continues to move in the first direction, the piston subsequently engages the locking pin to retract said pin from the valve member.

19. The apparatus of claim 17, wherein the fluidic pressure exerted upon the piston is provided by inlet fluid adjacent the valve member, and wherein the valve member is moved to the remaining one of the open and closed positions in response to fluidic pressure from said inlet fluid.

20. The apparatus of claim 17, wherein the selected position comprises the closed position.

21. The apparatus of claim 17, wherein the selected position comprises the open position.

* * * * *